United States Patent
Sheng et al.

(10) Patent No.: US 10,289,970 B2
(45) Date of Patent: May 14, 2019

(54) EFFICIENT RESOURCE MANAGEMENT USING MOBILE DEVICES AND WEARABLE DEVICES

(71) Applicant: FMR LLC, Boston, MA (US)

(72) Inventors: Xinxin Sheng, Cary, NC (US); John C. McDonough, Nahant, MA (US)

(73) Assignee: FMR LLC, Boston, MA (US)

( * ) Notice: Subject to any disclaimer, the term of this patent is extended or adjusted under 35 U.S.C. 154(b) by 376 days.

(21) Appl. No.: 15/249,339

(22) Filed: Aug. 26, 2016

(65) Prior Publication Data

US 2018/0060791 A1   Mar. 1, 2018

(51) Int. Cl.
*G06Q 10/06* (2012.01)
*H04M 3/523* (2006.01)
*H04W 4/02* (2018.01)
*H04W 4/12* (2009.01)

(52) U.S. Cl.
CPC .......... *G06Q 10/063114* (2013.01); *G06Q 10/06315* (2013.01); *G06Q 10/063112* (2013.01); *H04M 3/523* (2013.01); *H04M 2203/2072* (2013.01); *H04M 2203/402* (2013.01); *H04M 2242/30* (2013.01); *H04W 4/023* (2013.01); *H04W 4/12* (2013.01)

(58) Field of Classification Search
CPC ..... G06Q 10/063112; G06Q 10/06315; H04M 3/523
USPC ........................................................ 705/7.14
See application file for complete search history.

(56) References Cited

U.S. PATENT DOCUMENTS

| | | | |
|---|---|---|---|
| 6,804,345 B1 * | 10/2004 | Bala ..................... | H04M 3/382 379/265.04 |
| 8,369,936 B2 | 2/2013 | Farringdon et al. | |
| 8,825,507 B1 * | 9/2014 | Ginda ................. | G06Q 10/1095 379/265.05 |
| 8,925,172 B2 | 1/2015 | Noble, Jr. et al. | |
| 9,280,754 B1 * | 3/2016 | Schwartz ....... | G06Q 10/063116 |
| 2009/0016521 A1 * | 1/2009 | Griffin ................ | H04M 3/5238 379/265.03 |

(Continued)

OTHER PUBLICATIONS

Patrick Campbell, "How to Implement a Dynamic Pricing Strategy (Without the PR Backlash)," available at http://www.priceintelligently.com/blog/bid/198355/How-to-Implement-a-Dynamic-Pricing-Strategy-Without-the-PR-Backlash, dated Jun. 3, 2014, 10 pages.

*Primary Examiner* — Dylan C White
(74) *Attorney, Agent, or Firm* — Proskauer Rose LLP (57) ABSTRACT

Methods and apparatuses are described for efficient resource management using mobile devices and wearable devices. A server determines an event causing unavailability of a center in a distributed network. The server determines an expected demand for service from the distributed network during an upcoming time period and identifies a mobile device and a wearable device associated with each staff member assigned to work at one of the plurality of centers that is available. The server retrieves location data from the mobile device and biometric data from the wearable device. The server identifies staff members capable of working and initiates a communication to the mobile device associated with each staff member capable of working. The server receives a response from the mobile device indicating whether the staff member has accepted and determines whether the expected demand from the distributed network during the upcoming time period is satisfied.

29 Claims, 6 Drawing Sheets

(56) References Cited

U.S. PATENT DOCUMENTS

| | | | | |
|---|---|---|---|---|
| 2014/0169548 | A1* | 6/2014 | McDaniel | H04M 3/5175 |
| | | | | 379/265.06 |
| 2014/0200941 | A1* | 7/2014 | McDaniel | G06Q 10/063116 |
| | | | | 705/7.16 |
| 2015/0347955 | A1* | 12/2015 | Fairbanks | G06Q 10/063116 |
| | | | | 705/7.16 |
| 2016/0019491 | A1* | 1/2016 | Arlia | G06Q 10/063112 |
| | | | | 705/7.14 |
| 2017/0169382 | A1* | 6/2017 | Thapliyal | G06Q 10/063114 |
| 2017/0177807 | A1* | 6/2017 | Fabian | G06Q 10/087 |
| 2017/0178040 | A1* | 6/2017 | Yoakum | G06Q 10/06311 |
| 2017/0178051 | A1* | 6/2017 | Silverman | G06Q 10/063116 |
| 2017/0200112 | A1* | 7/2017 | Liu | G06Q 10/063114 |
| 2017/0278495 | A1* | 9/2017 | Akazawa | G10H 1/38 |
| 2017/0372335 | A1* | 12/2017 | Kozloski | G06Q 30/0202 |
| 2018/0032944 | A1* | 2/2018 | Sarvana | G06Q 10/063112 |
| 2018/0247276 | A1* | 8/2018 | Tamma | G06Q 10/1097 |

* cited by examiner

EFFICIENT RESOURCE MANAGEMENT USING MOBILE DEVICES AND WEARABLE DEVICES

TECHNICAL FIELD

This application relates generally to methods and apparatuses, including computer program products, for efficient resource management using mobile devices and wearable devices.

BACKGROUND

One of the greatest challenges in achieving adequate scaling of resources in a working environment such as a call center (e.g., performing tasks, assisting customers, responding to service inquiries and the like) is scheduling a sufficient number of support staff when those individuals are most needed (i.e., when demand for service is high), but without having to incur extraordinary expenses.

Figure 1:
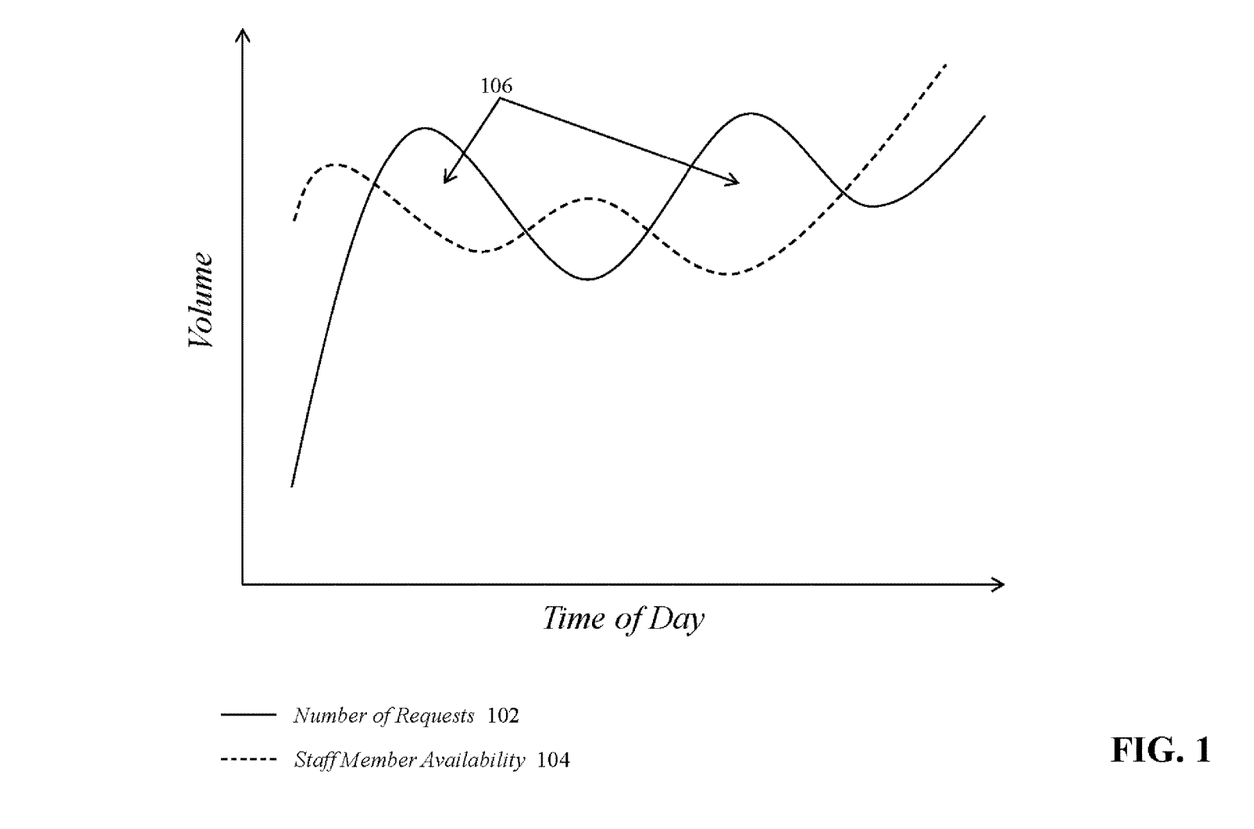
FIG. 1 is a chart comparing customer request volume for a center with staff member scheduling.

Generally, a common method is to assign a fixed schedule of working hours to 100% of the population of workers. Typically, this method results in many staff members being displeased with their work schedule at some point during the schedule period because the schedule is inflexible but the workers' schedules have unforeseen changes (e.g., sickness, appointments, emergencies). Another method is to put a work schedule out to bid, often giving more senior staff members first priority to choose working hours. Typically, this method results in having certain staff members assigned to work during time periods where their skillset and experience may not match the service needs at that time. Another method is the distributed model, where all staff members work from home. However, this method in fact does not address flexible scheduling or peak service needs at all. Instead, it is typically just a ploy to save money on office space regardless of meeting the staff member needs or employer requirements. As an example, FIG. 1 is a chart comparing customer request volume for a center with staff member scheduling. As shown in FIG. 1, the customer request volume 102 typically does not synchronize with the availability of staff members 104 to handle the requests. The gaps 106 between the two curves represent the times of day when the incoming service requests are not covered by the available staff members—indicating a deficiency of service.

And, none of the methods described above allow for intra-period schedule changes (e.g., a snowstorm near an office that causes power outages or disrupts the work environment, a staff member has a sick infant and unexpectedly needs to visit the doctor, and so forth). For example, in the latter scenario, the staff member would likely miss an entire day of work instead of working less than a full day, going to the appointment at 9:00 am, and then returning to work between 11:00 am and 3:00 pm, which coincide with peak staffing needs at the workplace.

In addition, the above scheduling methods do not leverage advanced data aggregation and computing technologies relating to the staff members, such as information gleaned from mobile devices and wearable devices assigned to the staff members, in order to dynamically call in additional support staff (also called 'just-in-time' staffing) in times of increased need or unexpected schedule changes and ensure that the workplace is adequately staffed at all times.

SUMMARY

Therefore, methods and systems are needed to enable workplaces to utilize advanced metrics about their staff members in conjunction with a dynamic resource management paradigm to generate a flexible and cost-effective plan of resource allocation. The techniques described herein provide the advantage of only affecting a minor percentage of the overall working population of a workplace yet still achieving the desired outcome of complete coverage in staffing in response to the demands of the workplace.

The invention, in one aspect, features a method for efficient resource management using mobile devices and wearable devices. A server computing device:

a) determines an event causing unavailability of at least one of a plurality of centers in a distributed network;
b) determines an expected demand for service from the distributed network during an upcoming time period;
c) identifies a mobile device and a wearable device associated with each of one or more staff members assigned to work at one of the plurality of centers that is available;
d) retrieves location data from the mobile device;
e) retrieves biometric data from the wearable device;
f) identifies one or more staff members capable of working at a center that is not affected by the event during the upcoming time period, by analyzing the location data and the biometric data;
g) initiates a communication to the mobile device associated with each staff member capable of working at a center that is not affected by the event, the communication requesting that the staff member begin working at a predetermined time during the upcoming time period;
h) receives a response to the communication from the mobile device indicating whether the corresponding staff member has accepted the request to begin working; and
i) determines whether the expected demand for service from the distributed network during the upcoming time period is satisfied based upon the staff members that have accepted the request to being working.

The invention, in another aspect, features a system for efficient resource management using mobile devices and wearable devices. The system includes a server computing device that is configured to:

a) determine an event to cause causing unavailability of at least one of a plurality of centers in a distributed network;
b) determine an expected demand for service from the distributed network during an upcoming time period;
c) identify a mobile device and a wearable device associated with each of one or more staff members assigned to work at one of the plurality of centers that is available;
d) retrieve location data from the mobile device;
e) retrieve biometric data from the wearable device;
f) identify one or more staff members capable of working at a center that is not affected by the event during the upcoming time period, by analyzing the location data and the biometric data;
g) initiate a communication to the mobile device associated with each staff member capable of working at a center that is not affected by the event, the communication requesting that the staff member begin working at a predetermined time during the upcoming time period;
h) receive a response to the communication from the mobile device indicating whether the corresponding staff member has accepted the request to begin working; and i) determine whether the expected demand for service from the distributed network during the upcoming time period is satisfied based upon the staff members that have accepted the request to being working.

The invention, in another aspect, features a computer program product, tangibly embodied in a non-transitory computer readable storage device, for efficient resource management using mobile devices and wearable devices. The computer program product includes instructions operable to cause a server computing device to:

a) determine an event causing unavailability of at least one of a plurality of centers in a distributed network;
b) determine an expected demand for service from the distributed center network during an upcoming time period;
c) identify a mobile device and a wearable device associated with each of one or more staff members assigned to work at one of the plurality of centers that is available;
d) retrieve location data from the mobile device;
e) retrieve biometric data from the wearable device;
f) identify one or more staff members capable of working at a center that is not affected by the event during the upcoming time period, by analyzing the location data and the biometric data;
g) initiate a communication to the mobile device associated with each staff member capable of working at a center that is not affected by the event, the communication requesting that the staff member begin working at a predetermined time during the upcoming time period;
h) receive a response to the communication from the mobile device indicating whether the corresponding staff member has accepted the request to begin working; and
i) determine whether the expected demand for service from the distributed network during the upcoming time period is satisfied based upon the staff members that have accepted the request to being working.

Any of the above aspects can include one or more of the following features. In some embodiments, the server computing device repeats steps a) to i) if the server computing device determines that the expected demand for service from the distributed network during the upcoming time period is not satisfied. In some embodiments, step c) further comprises identifying, by the server computing device, a skillset of each of the one or more staff members assigned to work at one of the plurality of centers that is not affected by the event.

In some embodiments, the server computing device determines if the skillset of each of the one or more staff members assigned to work at one of the plurality of centers that is not affected by the event matches a skillset required for the expected demand for service during the upcoming time period, and performs steps d) to h) for only the staff members whose skillset matches the skillset required for the expected demand for service during the upcoming time period.

In some embodiments, the location data comprises current global positioning system (GPS) coordinates collected by a GPS receiver of the mobile device. In some embodiments, for step f) the server computing device determines a travel time of the staff member associated with the mobile device to reach the center by analyzing the GPS coordinates in conjunction with traffic information and travel information. In some embodiments, the server computing device performs steps g) to h) for only the staff members whose travel time to reach the center results in an arrival time at the center that is within the upcoming time period.

In some embodiments, the biometric data comprises current heart rate information. In some embodiments, for step f) the server computing device determines an activity level of the staff member associated with the wearable device based upon the heart rate information. In some embodiments, the server computing device performs steps g) to h) for only the staff members whose activity level indicates that the staff member is available to begin working within the upcoming time period.

In some embodiments, the communication comprises an interactive voice response (IVR) system message via telephone connection to the mobile device, based upon a phone number retrieved by the server computing device. In some embodiments, the response comprises a verbal answer provided by the staff member based upon the IVR system message.

In some embodiments, the communication comprises a text-based message electronically conveyed to the mobile device, based upon a contact address retrieved by the server computing device. In some embodiments, the response comprises a text-based answer provided by the staff member based upon the text-based message.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 2:
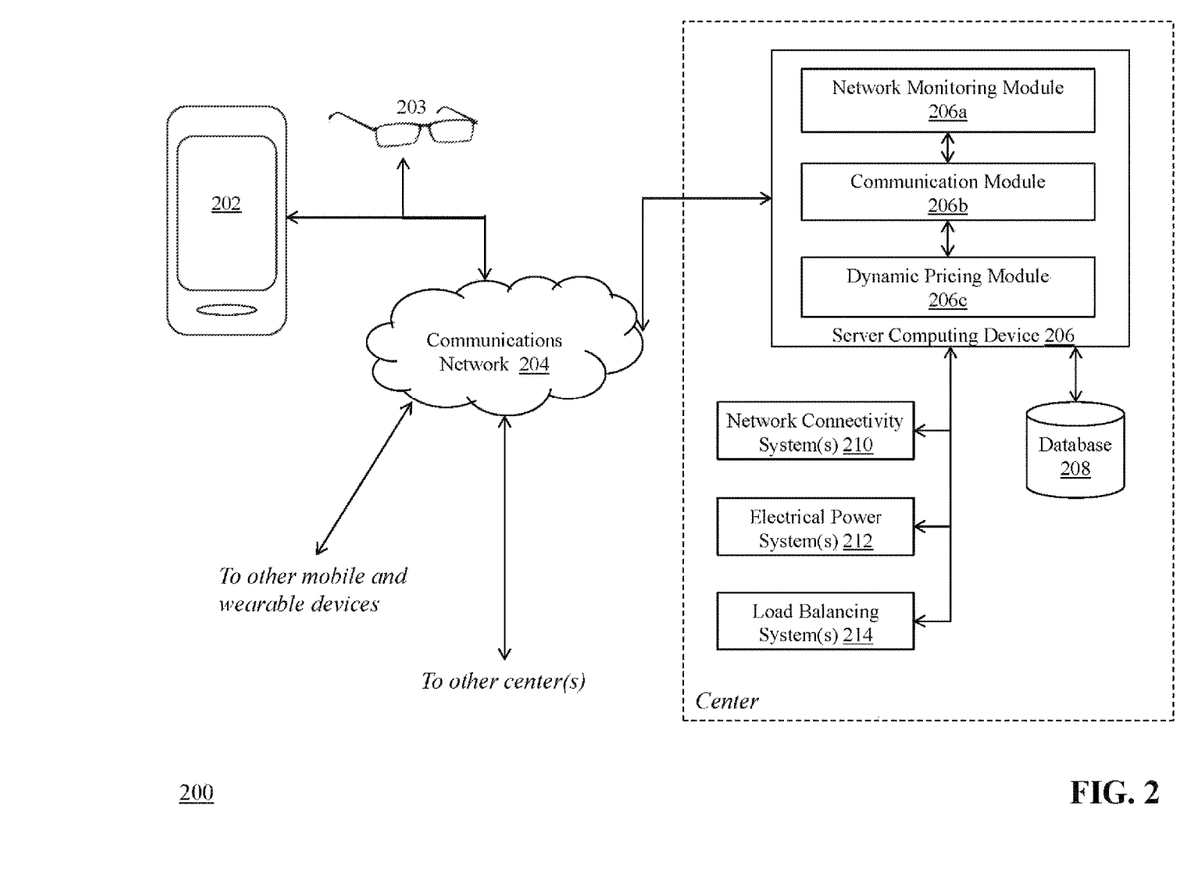
FIG. 2 is a block diagram of a system for efficient resource management using mobile devices and wearable devices.

FIG. 2 is a block diagram of a system 200 for efficient resource management using mobile devices and wearable devices. The system 200 includes a mobile device 202 and a wearable device 203 (e.g., of a staff member), a communications network 204, a server computing device 206 that includes a network monitoring module 206a, a communication module 206b and a dynamic pricing module 206c, a database 208, network connectivity system(s) 210, electrical power system(s) 212, and load balancing system(s) 214.

The mobile device 202 uses software and circuitry (e.g., processor, memory) to execute applications and to communicate with the wearable device 203 and the server computing device 206 via the communication network 204 (e.g., using an app installed on the device to connect to the Internet via an embedded Wi-Fi antenna). The mobile device 202 can also communicate with other locally-connected devices (e.g., Bluetooth, Wi-Fi). The mobile device 202 further includes global positioning system (GPS) circuitry and functionality to enable determination of a location of the mobile device 202. Example mobile computing devices 202 can include, but are not limited to, a smart phone (e.g., Apple iPhone®, Windows®, and/or Android™-based device) or other similar mobile communications devices.

The wearable device 203 is preferably a small electronic device that can be worn by a user (e.g., a wristband) or affixed to the user (e.g., a clip attached to the user's clothing or secured to the user's skin). The wearable device 203 generally includes circuitry such as a processor or chip, wiring, and related hardware (e.g., transceiver, antenna) that provide the capability of communicating with, e.g., the mobile device 202 and/or the communications network 204 via a wireless communication protocol and/or frequency. Exemplary wearable devices can include, but are not limited to, fabrics with integrated wiring and sensors; medical devices for in-hospital use such as heart-rate monitors; radio-frequency identification (RFID) or near-field communication (NFC) wristbands; smart watches and fitness bands that keep track of the user's vital signs; Bluetooth headsets or earpieces; smart glasses such as Google® Glass; electronic jewelry having short-range communication capabilities; and clothing with embedded light-emitting diodes (LEDs) to display custom messages or artwork.

The communications network 204 enables the mobile device 202 and the wearable device 203 to communicate with the server computing device 206. The network 204 may be a local network, such as a LAN, or a wide area network, such as the Internet and/or a cellular network. In some embodiments, the network 204 is comprised of several discrete networks and/or sub-networks (e.g., cellular to Internet).

The server computing device 206 a device including specialized hardware and/or software modules that execute on a processor and interact with memory modules of the server computing device 206, to receive data from other components of the system 200, transmit data to other components of the system 200, and perform functions for efficient resource management as described herein. The server computing device 206 includes several computing modules 206a-206c that execute on the processor of the server computing device 206. In some embodiments, the modules 206a-206c are specialized sets of computer software instructions programmed onto one or more dedicated processors in the server computing device 206 and can include specifically-designated memory locations and/or registers for executing the specialized computer software instructions.

Although the modules 206a-206c are shown in FIG. 2 as executing within the same server computing device 206, in some embodiments the functionality of the modules 206a-206c can be distributed among a plurality of server computing devices. As shown in FIG. 2, the server computing device 206 enables the modules 206a-206c to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 206a-206c is described in detail below.

The database 208 is a computing device (or in some embodiments, a set of computing devices) coupled to the server computing device 206 and is configured to receive, generate, and store specific segments of data relating to the process of efficient resource management as described herein. In some embodiments, all or a portion of the database 208 can be integrated with the server computing device 206 or be located on a separate computing device or devices. The database 208 can comprise one or more databases configured to store portions of data used by the other components of the system 200, as will be described in greater detail below. An exemplary database 208 is MySQL™ available from Oracle Corp. of Redwood City, Calif.

The system 200 also include several subsystems that are associated with the physical and technical infrastructure of one or more work facilities, and which provide information to the modules 206a-206b of the server computing device 106 relating to the status of computing systems at each center. The network connectivity system(s) 210 provide information relating to the status of network connections to and from the center. The electrical power system(s) 212 provide information relating to the status of electrical power availability at the center. The load balancing system(s) 214 provide information relating to the capacity of the center in handling service requests.

It should be appreciated that while FIG. 2 depicts one mobile device 202 and one wearable device 203, the system 200 encompasses a plurality of mobile devices and wearable devices that are associated with a plurality of staff members. In addition, while FIG. 2 depicts one center, the distributed network is composed of multiple centers, each of which may have its own server computing device, database, and related subsystems. Also, in some embodiments, the server computing device 206 is located at a central node in the distributed network and is capable of monitoring and communicating with various computing devices and subsystems at each center in the distributed network.

Figure 3A:
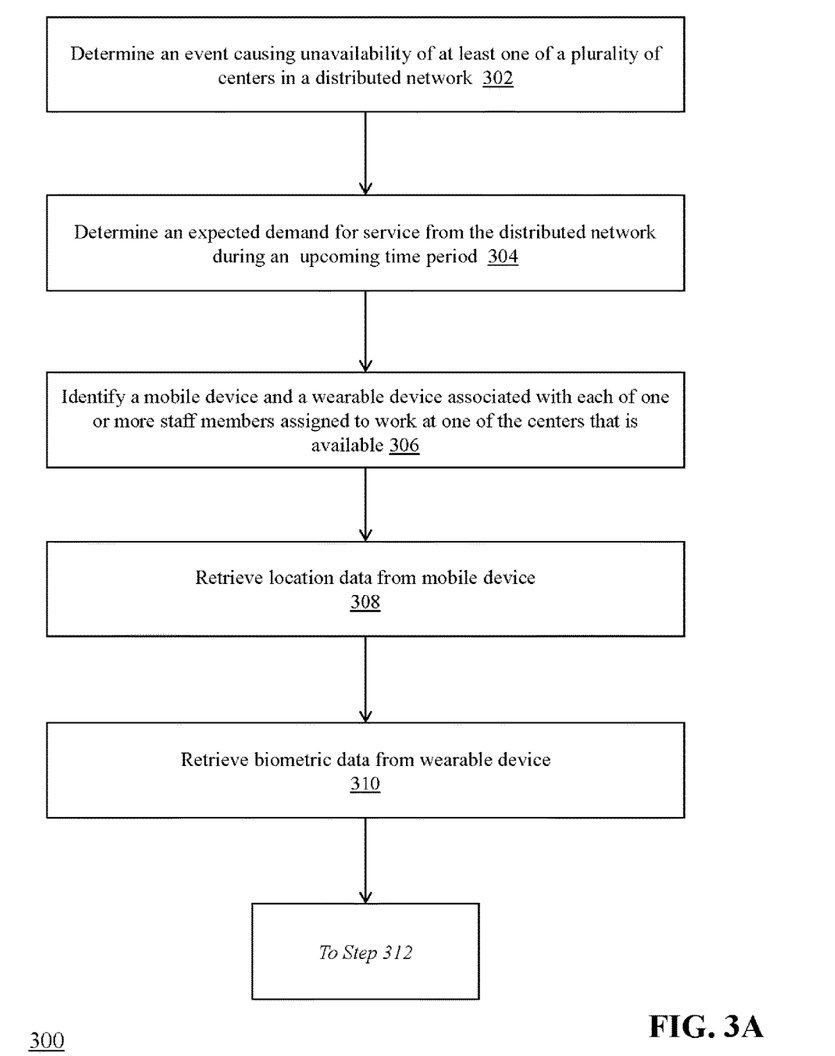
FIGS. 3A and 3B comprise a flow diagram of a method for efficient resource management using mobile devices and wearable devices.
Figure 3B:
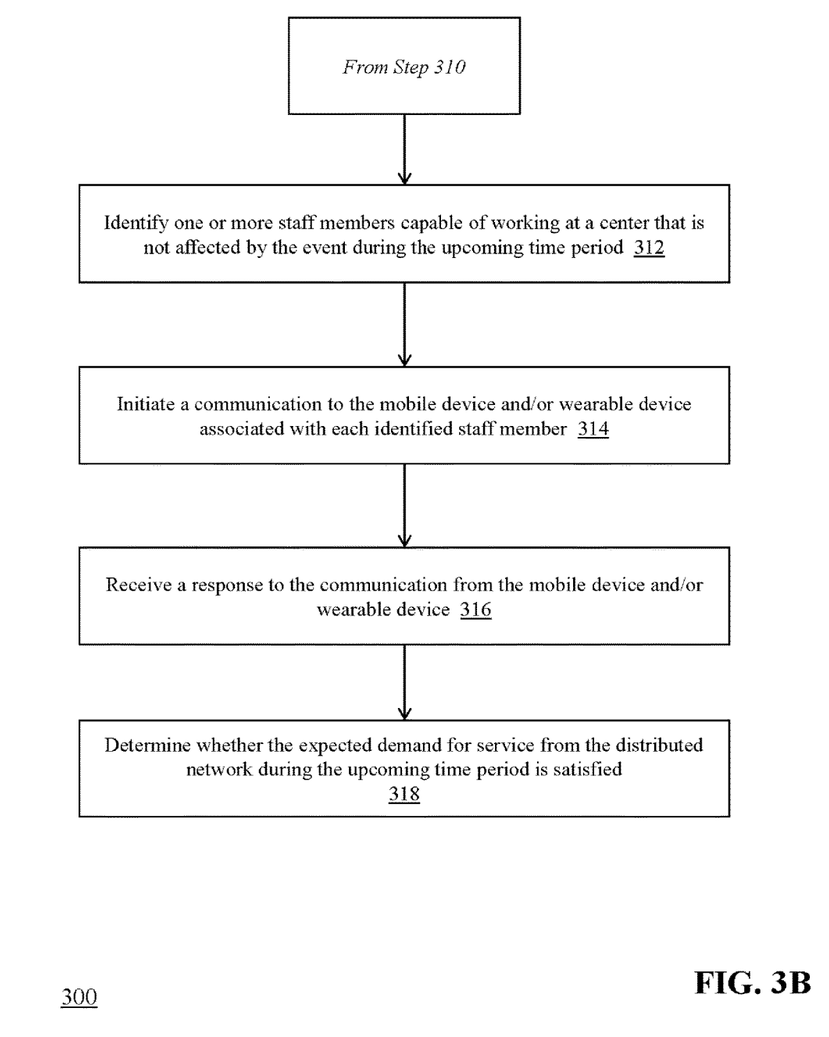

FIGS. 3A and 3B comprise a flow diagram of a method 300 for method for efficient resource management using mobile devices and wearable devices, using the system 200 of FIG. 2. The network monitoring module 206a determines (302) an event causing unavailability of at least one of a plurality of centers in the distributed network. For example, the network monitoring module 206a can comprise an executable process that monitors characteristics like system connectivity, power status, and system status/workload in order to determine whether a specific center is currently experiencing an event that has caused the center to be unavailable for handling service requests.

For example, if the network monitoring module 206a monitors system connectivity at each center (e.g., by periodically connecting to computing systems 210 at the center and requesting a system connectivity status), the network monitoring module 206a can determine that one or more computing systems at the center has experienced a loss of connectivity to either the module itself or to other necessary computing resources. In another example, if the network monitoring module 206a monitors power status at each center (e.g., by periodically requesting a power status report from a system 212 at the center and/or an external resource available from a utility provider, by receiving a notification of power interruption from the center and/or the utility provider), the network monitoring module 206a can determine that the center has experienced a power loss and is no longer available to handle service requests. In another example, if the network monitoring module 206a monitors system workload at each center (e.g., by periodically connecting to computing systems 214 at the center and collecting bandwidth or usage information that relates to the current demand for service at the center in relation to the current capacity for handling service requests at the center), the network monitoring module 206a can determine that the center is at or beyond its capacity to handle incoming service requests.

In some embodiments, the network monitoring module 206a can use the above sources of data, alone or in conjunction with external data sources (such as weather forecast data, power grid consumption data, network service provider connectivity data, and the like) to predict anticipated events that are likely to cause unavailability of one or more centers in the distributed network. For example, the network monitoring module 206a can analyze weather forecast information associated with the geographic location of a center and determine that a severe thunderstorm is expected to pass over the center in the near future. Due to the likelihood of network connectivity and/or electrical power interruption, the network monitoring module 206a can determine that the center is likely to experience an event that causes unavailability of the center at an approximate time in the future.

The network monitoring module 206a also determines (304) an expected demand for service from the distributed center network during an upcoming time period. In one example, the network monitoring module 206a can connect to reporting servers located at each center to collect workload information pertaining to service requests being handled at each center. The network monitoring module 206a can also utilize historical workload data for each center, and for the distributed network as a whole (e.g., stored in database 208) in order to understand an approximate expected demand at various points in the future (e.g., in the next thirty minutes, in the next hour, between one and two hours from now, and so forth). The network monitoring module 206a then estimates a volume of service requests inbound to the distributed network during the desired time periods.

Because the overall capacity of the distributed network to handle service requests will be diminished as the result of one or more of the centers being unavailable, the system 200 endeavors reactively (or proactively) to initiate processing that automatically contacts staff members that are available to work (and in some cases, staff members that are also preferred due to schedule/cost/experience) at other centers in the distributed network, such that other centers in the network that remain available can increase their service capacity accordingly to compensate for the capacity lost from the unavailable center(s). In this way, the distributed network maintains its overall capacity for service by dynamically and flexibly evaluating and reacting to expected demand and expected or unexpected center outage.

The communication module 206b of server computing device 206 identifies (306) a mobile device (e.g., device 202) and a wearable device (e.g., device 203) associated with each of one or more staff members assigned to work at one of the plurality of centers that is available. For example, the communication module 206b can analyze profile information contained in, e.g., database 208, where the profile information includes contact information such as telephone number(s), email address(es), and the like for each staff member. The profile information additionally includes information relating to specific mobile device(s) 202 and wearable device(s) 203 that are assigned to each staff member. For example, the profile information can contain device identifiers that uniquely correspond to each device—like MAC addresses and/or serial numbers—so that the communication module is capable of directly contacting a specific device associated with a staff member.

In addition, the profile information contains demographic information (e.g., name, age) for each staff member, workplace responsibilities and capabilities (e.g., performance history, skill set, role), compensation data, flexibility ratio (e.g., an estimate of how likely the staff member is to be available to work based upon family demands), vehicle availability, home location, and the like.

To dynamically identify the mobile device(s) 202 and wearable device(s) 203 that are associated with certain staff members, the communication module 206b analyzes a variety of different characteristics. In some embodiments, the communication module 206b identifies a particular set of staff members based upon the center(s) to which they are assigned. For example, if the center that is experiencing an event that results in unavailability handles a particular type of service request, the communication module 206b can select one or more staff members at other centers that handle the same or similar requests. Similarly, if a specific level of experience is desired or required to compensate for the unavailable center, the communication module 206b analyzes skill-related information for staff members.

In some embodiments, the server computing device 206 can leverage the dynamic pricing module 206c to execute a dynamic pricing algorithm in order to identify only a certain segment of the overall staff member population that should be contacted in the event of a service disruption to one of the centers and to incentivize those staff members into working (i.e., provide additional compensation and/or benefits to employees that choose to begin working). The dynamic pricing algorithm provides the advantage of only affecting a portion of the staff members in terms of scheduling, while also reducing costs associated with having the incorrect number of staff members working at any given time.

Figure 4:
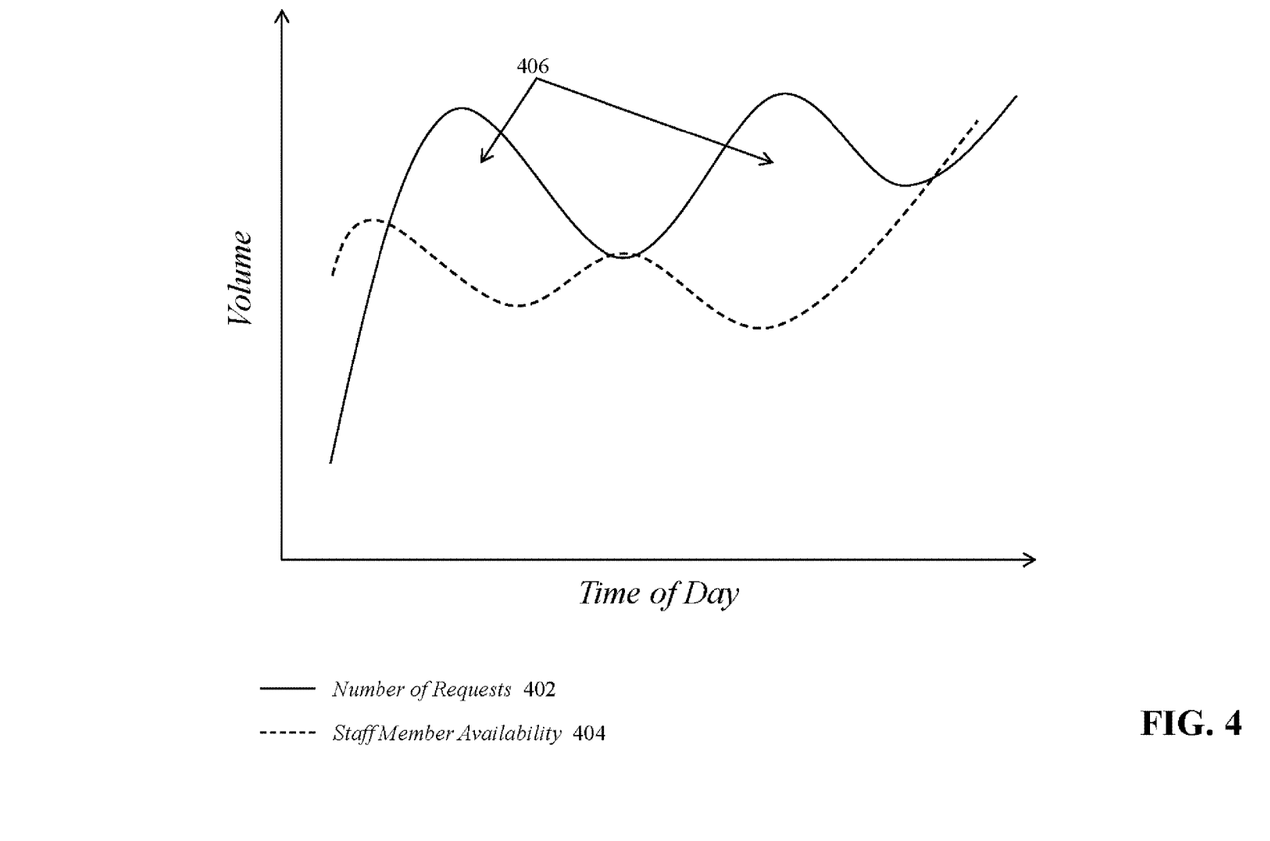
FIG. 4 is a chart comparing customer request volume for a center with staff member scheduling.

In executing the dynamic pricing algorithm, the dynamic pricing module 206c can determine that, e.g., thirty percent of the staff members should be incentivized so that peak service request periods are met and to avoid having too many staff members available during slow service request periods. It should be appreciated that thirty percent is an example, and other percentages of the overall staff member population can be applicable to the dynamic pricing algorithm described herein. Generally, it is satisfactory to incentivize only a portion of the overall population because at any given time it is likely that a majority of the staff members are appropriately scheduled to meet any expected service requests and only a smaller number of staff members are required to compensate for higher-than-expected demand in the event a center is offline. For example, the chart of FIG. 1 can be modified to depict the amount of requests that the currently-working staff member population can handle—see FIG. 4. As shown in FIG. 4, the staff member availability curve 402 has been moved down to achieve as little redundancy with the number of requests curve 404 as possible. Therefore, approximately seventy percent of the regularly-scheduled staff members can handle approximately eighty percent of the service requests. As a result, the gaps 406 between the two curves is the amount of unmet service requests that need to be handled—which results in approximately twenty to thirty percent of the overall service requests, much less than trying to determine appropriate staffing for one-hundred percent of the service requests.

The dynamic pricing module 206c can also incorporate a machine learning methodology to improve the accuracy of the population percentage that needs to be incentivized. For example, after some time has passed, the dynamic pricing module 206c can adjust the default percentage up or down to the appropriate percentage of staff members incentivized to meet the needs of the distributed network. Another benefit derived from the dynamic pricing algorithm is the ability to tune the algorithms using historical data in, e.g., scheduling, human resources, and payroll systems. For example, the dynamic pricing module 206c can evaluate very granular metrics, such as performance or handle time for certain service request types, and offer incentives to a greater population of staff members that are faster or more efficient in terms of request handle time, thus reducing further costs because the distributed network has a need for even fewer staff members. In some embodiments, the dynamic pricing module 206c can be more flexible in the scheduling by utilizing a bidding method, e.g., more senior or experienced staff members are incentivized to work during their preferred times—as long as these members are considered higher performers with respect to the current needs of the distributed network.

Turning back to FIG. 3, once the communication module 206b has identified the mobile device(s) 202 and wearable device(s) 203 associated with the pool of staff members that the module has selected, the communication module 206b retrieves (208) location data from the mobile device(s) 202 and/or the wearable device(s) 203. For example, the communication module 206b can contact the mobile device 202 using global positioning system (GPS) technology to ascertain the approximate geographic location of the mobile device 202—including location history to see whether the mobile device 202 is currently traveling (e.g., moving closer to the center/workspace or away from it). Other similar location-based tracking techniques—e.g., NFC, Wi-Fi and the like—are equally applicable here.

The communication module 206b also retrieves (210) biometric data from the mobile device(s) 202 and/or the wearable device(s) 203. For example, a wearable device 203 can be configured to collect and track information associated with the wearer of the device, such as heart rate, sleep/wake status, and so forth. In addition, in some embodiments, the wearable device 203 can have unique monitoring functionality, such as monitoring blood pressure, blood oxygen level, and similar biometric indicators. Also, the wearable device 203 can be communicably coupled to other 'smart' devices such as a medicine/pill case that provides an indication to the wearable device 203 whether e.g., the staff member has taken necessary or appropriate medication for that day. In the event that the staff member has not complied, the communication module 206a can factor that piece of information into whether to request that the staff member begin working.

Upon compiling the above-mentioned data elements, the communication module 206b identifies (212) one or more staff members capable of working at a center that is not affected by the event during the upcoming time period by analyzing the location data and the biometric data. For example, based upon the location data, the communication module 206b can determine (i) approximately how far away the staff member is from one or more centers (or, in the case of telecommuting staff, how far away the member is from his home workstation) and (ii) approximately how long it would take for the staff member to reach the center and/or workstation, e.g., by certain types of transportation. The communication module 206b can also use external location-based data, such as traffic information or weather information at the staff member's current location and at the destination location, in order to develop an accurate estimate of the travel time for each staff member. In understanding each staff member's travel time to his or her workspace, the communication module 206b can filter out staff members that may be too far away or have too long of travel time to arrive, and thus may select only those staff members whose distance and/or travel time is within a desired tolerance (in addition to any other criteria described herein).

Also, based upon the biometric data, the communication module 206b can determine whether the staff member is engaged in an activity that would restrict or prevent him from being able to work at a center during the upcoming time period. For example, the biometric data analyzed by the communication module 206b may indicate that the staff member is currently exercising (e.g., has a heart rate that is above a prescribed threshold), or the biometric data may indicate that the staff member is asleep. The communication module 206b can filter out these staff members from selection for working at the center.

It should further be appreciated that each staff member may have a different biometric state that can be considered normal for that staff member. For example, a certain staff member may naturally have higher blood pressure than what may be expected of an average person at a similar age, weight, height, and the like. As such, the communication module 206b can track each member's historical biometric data and establish a baseline for each element of biometric data. Then, when the communication module 206b receives new biometric data readings from the wearable device(s) 203, the module 206b can determine whether the new readings are within a predetermined tolerance of the baseline biometric data for that staff member. Another facet of this functionality involves specific baseline biometric readings while the staff member is working or located at the center. In one example, a staff member may have an elevated heart rate while at work (due to, e.g., normal stresses of the work environment). The elevated heart rate is not suggestive of any health problems, but does differ from the member's heart rate when, e.g., asleep or not at work. The communication module 206b can recognize and account for this change when determining whether the staff member's biometric data are indicative of any health problems or activities that would prevent or restrict the staff member from working to his full capacity.

Once the communication module 206b has identified a set of staff members that are capable of working, the communication module 206b initiates (214) a communication to the mobile device 202 and/or wearable device 203 associated with each staff member capable of working at a center that is not affected by the event, where the communication requests that the staff member begin working at a predetermined time during the upcoming time period. For example, the communication module 206b can initiate a telephone call to the staff member's mobile device 202 that includes an automated voice prompt asking the staff member to begin working at a predetermined time and requesting a voice response from the staff member that indicates whether he or she will accept the request (e.g., yes or no). The communication can take on any of a variety of forms, including but not limited to email, text message, visual/audible/sensory alert at the user's wearable device 203, and so forth.

After transmitting the communication as described above, the communication module 206b receives (216) a response to the communication from the mobile device 202 and/or wearable device 203 indicating whether the corresponding staff member has accepted the request to begin working. As mentioned above, the communication can be a telephone call to the staff member's mobile device 202 which can request an automated voice response from the staff member indicating whether he or she will accept the request to begin working. Other types of communication can request a corresponding type of response (e.g., an email can include a clickable hyperlink for the member's response, a text message can request a return text message, and so forth).

Figure 5:
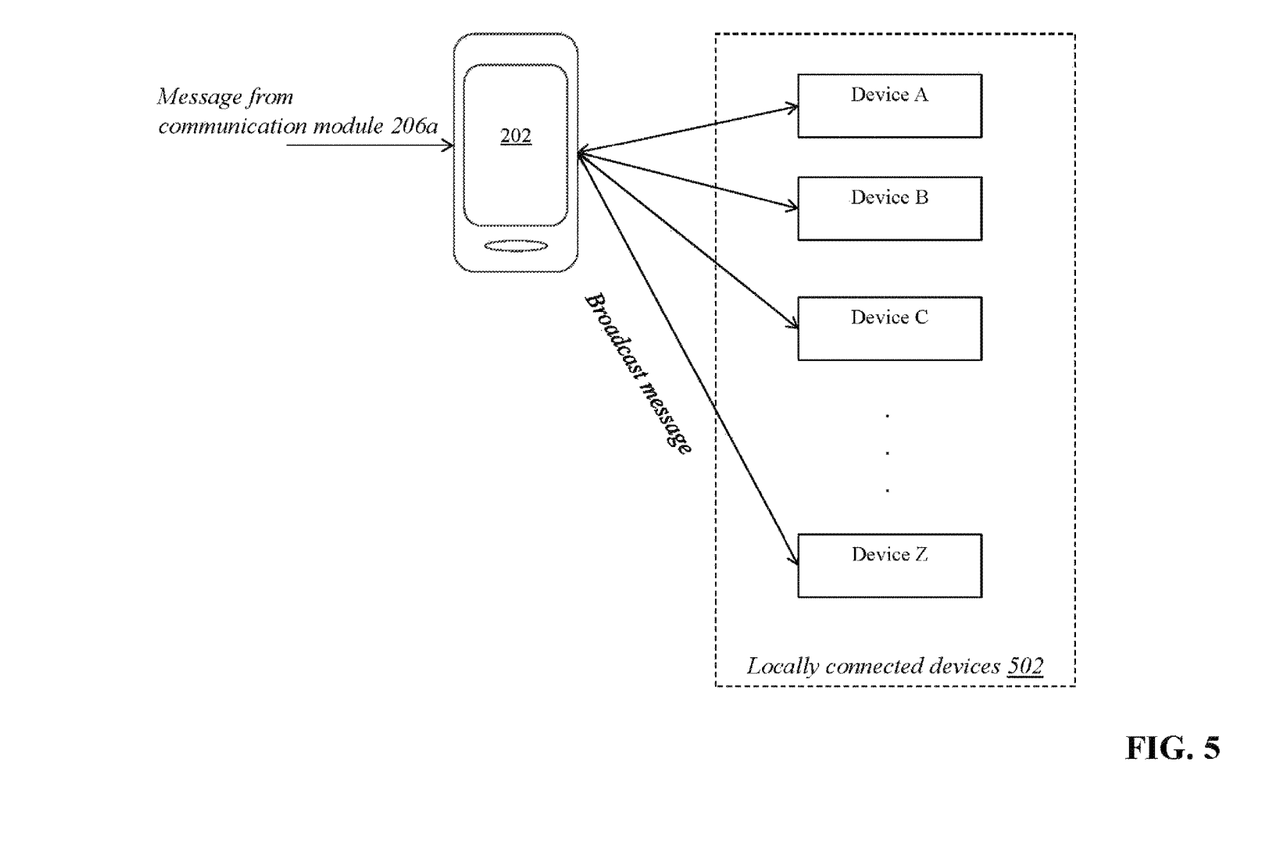
FIG. 5 is a block diagram depicting the transmission of a broadcast message from the mobile device to other locally-connected devices.

In some cases, however, the communication module 206b may not receive a response from a specifically-selected staff member—even though the communication module 206b detects, using information from the mobile device 202 and/or the wearable device 203, that the staff member is at a particular location and appears capable of working during the upcoming time frame. As an example, perhaps the staff member left his mobile phone 202 in his car and is unaware of the request to contact him. In these instances, the communication module 206b transmits a broadcast message through their mobile device 202 and/or wearable device 203 to other, locally connected devices 502 (e.g., wireless routers, smart appliances, other wearable devices, 'internet-of-things' (IOT) devices, and the like)—as shown in FIG. 5. When received by the locally connected devices 502, these devices can activate specific functionality in response to the broadcast message in order to alert the staff member of the incoming work request. For example, the mobile device 202 can retransmit the broadcast message to all currently-connected local devices 502 (e.g., by scanning the list of connected Bluetooth devices) and/or transmit the message to the Wi-Fi router/hotspot to which the mobile device is currently connected, which then circulates the message to all Wi-Fi connected devices (e.g., smart televisions, laptops, smart thermostats, and the like). Once the message is received, the respective devices can activate functionality such as audio messages, text messages, video messages, visual indicators (e.g., flashing lights), audible alerts, and so forth in order to prompt the staff member to access his mobile device. In some embodiments, each of the locally connected devices (if capable) can similarly extend the broadcast message to other devices that are connected to them.

Turning back to FIG. 3B, in the scenario where the selected list of staff members has each received the message and has indicated his or her response on whether he or she will accept the request to begin working, the communication module 206b receives the responses and determines (218) whether the expected demand for service from the distributed network during the upcoming time period is satisfied based upon the staff members that have accepted the request to being working. As mentioned above with respect to FIG. 1, there may be certain gaps 106 during which the amount of incoming requests to the distributed network (or to a certain center) exceeds the capacity or availability of staff members to handle the requests. The communication module 206b can analyze the staff member capacity or availability for an upcoming time period by including the capacity of the staff members that have accepted the request to begin working during that period, and then compare that capacity against the expected demand for service for the same upcoming time period (e.g., by analyzing historical data, making predictive estimates of request volume, etc.).

If there is still an expected gap between the request volume and the staff member availability, the communication module 206b can continue the processing to identify additional staff members that may be capable of working (e.g., but may have been less desirable that the staff members that were initially selected by the module). In another example, the communication module can relay an incentive, determined using the dynamic pricing algorithm described above, to the staff members (even those that previously declined the offer to begin working) to determine if a higher acceptance rate can be achieved.

The above-described techniques can be implemented in specialized digital and/or analog electronic circuitry, or in specialized computer hardware, firmware, and software. The implementation can be as a computer program product, i.e., a computer program tangibly embodied in a machine-readable storage device, for execution by, or to control the operation of, a specialized data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more specialized processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special-purpose processors and/or microprocessors specifically programmed with specialized instructions executable to perform the methods described herein. Generally, a processor receives instructions and data from a read-only memory or a random access memory or both. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for efficient resource management using mobile devices and wearable devices, the method comprising:

a) determining, by a server computing device, an event causing unavailability of at least one of a plurality of centers in a distributed network;

b) determining, by the server computing device, an expected demand for service from the distributed network during an upcoming time period;

c) identifying, by the server computing device, a mobile device and a wearable device associated with each of one or more staff members assigned to work at one of the plurality of centers that is available;

d) retrieving, by the server computing device, location data from the mobile device;

e) retrieving, by the server computing device, biometric data from the wearable device;

f) identifying, by the server computing device, one or more staff members capable of working at a center that is not affected by the event during the upcoming time period, by analyzing the location data and the biometric data;

g) initiating, by the server computing device, a communication to the mobile device associated with each staff member capable of working at a center that is not affected by the event, the communication requesting that the staff member begin working at a predetermined time during the upcoming time period;

h) determining, by the server computing device, that a response to the communication to the mobile device associated with one or more of the staff members has not been received within a predetermined amount of time;

i) initiating, by the server computing device, a broadcast communication, via either the mobile device or the wearable device, to one or more other locally connected devices that are associated with either the mobile device or the wearable device associated with each staff member capable of working at a center that is not affected by the event, the broadcast communication requesting that the staff member begin working at a predetermined time during the upcoming time period;

j) receiving, by the server computing device, a response to the broadcast communication from the mobile device indicating whether the corresponding staff member has accepted the request to begin working; and k) determining, by the server computing device, whether the expected demand for service from the distributed network during the upcoming time period is satisfied based upon the staff members that have accepted the request to being working.

2. The method of claim 1, further comprising repeating, by the server computing device, steps a) to k) if the server computing device determines that the expected demand for service from the distributed network during the upcoming time period is not satisfied.

3. The method of claim 1, wherein step c) further comprises identifying, by the server computing device, a skillset of each of the one or more staff members assigned to work at one of the plurality of centers that is not affected by the event.

4. The method of claim 3, further comprising:
determining, by the server computing device, if the skillset of each of the one or more staff members assigned to work at one of the plurality of centers that is not affected by the event matches a skillset required for the expected demand for service during the upcoming time period; and
performing, by the server computing device, steps d) to j) for only the staff members whose skillset matches the skillset required for the expected demand for service during the upcoming time period.

5. The method of claim 1, wherein the location data comprises current global positioning system (GPS) coordinates collected by a GPS receiver of the mobile device.

6. The method of claim 5, wherein for step f) the server computing device determines a travel time of the staff member associated with the mobile device to reach the center by analyzing the GPS coordinates in conjunction with traffic information and travel information.

7. The method of claim 6, further comprising performing, by the server computing device, steps g) to j) for only the staff members whose travel time to reach the center results in an arrival time at the center that is within the upcoming time period.

8. The method of claim 1, wherein the biometric data comprises current heart rate information, current blood pressure information, and current blood oxygen level information.

9. The method of claim 8, wherein for step f) the server computing device determines a working fitness level of the staff member associated with the wearable device based upon one or more of: the current heart rate information, the current blood pressure information, and the current blood oxygen level information.

10. The method of claim 9, further comprising performing, by the server computing device, steps g) to j) for only the staff members whose working fitness level indicates that the staff member is capable of working within the upcoming time period.

11. The method of claim 9, further comprising:
comparing, by the server computing device, the biometric data of the staff member to baseline biometric data previously captured by the server computing device for the staff member to determine whether the biometric data is within a predetermined tolerance of the baseline biometric data.

12. The method of claim 1, wherein the communication comprises an interactive voice response (IVR) system message via telephone connection to the mobile device, based upon a phone number retrieved by the server computing device.

13. The method of claim 1, wherein the communication comprises a text-based message electronically conveyed to the mobile device, based upon a contact address retrieved by the server computing device.

14. The method of claim 1, wherein the one or more other locally connected devices that are coupled to either the mobile device or the wearable device comprise a wireless router, a wireless hotspot, a smart appliance, and an TOT device.

15. A system for efficient resource management using mobile devices and wearable devices, the system comprising a server computing device that has a memory for storing computer-executable instructions and a processor that executes the computer-executable instructions to:
a) determine an event causing unavailability of at least one of a plurality of centers in a distributed network;
b) determine an expected demand for service from the distributed network during an upcoming time period;
c) identify a mobile device and a wearable device associated with each of one or more staff members assigned to work at one of the plurality of centers that is available;
d) retrieve location data from the mobile device;
e) retrieve biometric data from the wearable device;
f) identify one or more staff members capable of working at a center that is not affected by the event during the upcoming time period, by analyzing the location data and the biometric data;
g) initiate a communication to the mobile device associated with each staff member capable of working at a center that is not affected by the event, the communication requesting that the staff member begin working at a predetermined time during the upcoming time period;
h) determine that a response to the communication to the mobile device associated with one or more of the staff members has not been received within a predetermined amount of time;
i) initiate a broadcast communication, via either the mobile device or the wearable device, to one or more other locally connected devices that are associated with either the mobile device or the wearable device associated with each staff member capable of working at a center that is not affected by the event, the broadcast communication requesting that the staff member begin working at a predetermined time during the upcoming time period;
j) receive a response to the broadcast communication from the mobile device indicating whether the corresponding staff member has accepted the request to begin working; and
k) determine whether the expected demand for service from the distributed network during the upcoming time period is satisfied based upon the staff members that have accepted the request to being working.

16. The system of claim 15, wherein the server computing device is configured to repeat steps a) to k) if the server computing device determines that the expected demand for service from the distributed network during the upcoming time period is not satisfied.

17. The system of claim 15, wherein for step c) the server computing device is further configured to identify a skillset of each of the one or more staff members assigned to work at one of the plurality of centers that is not affected by the event.

18. The system of claim 17, wherein the server computing device is further configured to
determine if the skillset of each of the one or more staff members assigned to work at one of the plurality of centers that is not affected by the event matches a skillset required for the expected demand for service during the upcoming time period; and perform steps d) to j) for only the staff members whose skillset matches the skillset required for the expected demand for service during the upcoming time period.

19. The system of claim 15, wherein the location data comprises global positioning system (GPS) coordinates collected by a GPS receiver of the mobile device.

20. The system of claim 19, wherein for step f) the server computing device is configured to determine a travel time of the staff member associated with the mobile device to reach the center by analyzing the GPS coordinates in conjunction with traffic information and travel information.

21. The system of claim 20, wherein the server computing device is configured to perform steps g) to j) for only the staff members whose travel time to reach the center results in an arrival time at the center that is within the upcoming time period.

22. The system of claim 15, wherein the biometric data comprises current heart rate information, current blood pressure information, and current blood oxygen level information.

23. The system of claim 22, wherein for step f) the server computing device determines a working fitness level of the staff member associated with the wearable device based upon one or more of: the current heart rate information, the current blood pressure information, and the current blood oxygen level information.

24. The system of claim 23, wherein the server computing device is configured to perform steps g) to k) for only the staff members whose a working fitness level indicates that the staff member is capable of working within the upcoming time period.

25. The system of claim 23, wherein the server computing device compares the biometric data of the staff member to baseline biometric data previously captured by the server computing device for the staff member to determine whether the biometric data is within a predetermined tolerance of the baseline biometric data.

26. The system of claim 15, wherein the communication comprises an interactive voice response (IVR) system message via telephone connection to the mobile device, based upon a phone number retrieved by the server computing device.

27. The system of claim 15, wherein the communication comprises a text-based message electronically conveyed to the mobile device, based upon a contact address retrieved by the server computing device.

28. The system of claim 15, wherein the one or more other locally connected devices that are coupled to either the mobile device or the wearable device comprise a wireless router, a wireless hotspot, a smart appliance, and an TOT device.

29. A computer program product, tangibly embodied in a non-transitory computer readable storage device, for efficient resource management using mobile devices and wearable devices, the computer program product including instructions operable to cause a server computing device to:
   a) determine an event causing unavailability of at least one of a plurality of centers in a distributed network;
   b) determine an expected demand for service from the distributed network during an upcoming time period;
   c) identify a mobile device and a wearable device associated with each of one or more staff members assigned to work at one of the plurality of centers that is available;
   d) retrieve location data from the mobile device;
   e) retrieve biometric data from the wearable device;
   f) identify one or more staff members capable of working at a center that is not affected by the event during the upcoming time period, by analyzing the location data and the biometric data;
   g) initiate a communication to the mobile device associated with each staff member capable of working at a center that is not affected by the event, the communication requesting that the staff member begin working at a predetermined time during the upcoming time period;
   h) determine that a response to the communication to the mobile device associated with one or more of the staff members has not been received within a predetermined amount of time;
   i) initiate a broadcast communication, via either the mobile device or the wearable device, to one or more other locally connected devices that are associated with either the mobile device or the wearable device associated with each staff member capable of working at a center that is not affected by the event, the broadcast communication requesting that the staff member begin working at a predetermined time during the upcoming time period;
   j) receive a response to the broadcast communication from the mobile device indicating whether the corresponding staff member has accepted the request to begin working; and
   k) determine whether the expected demand for service from the distributed network during the upcoming time period is satisfied based upon the staff members that have accepted the request to being working.

* * * * *

UNITED STATES PATENT AND TRADEMARK OFFICE
CERTIFICATE OF CORRECTION

PATENT NO. : 10,289,970 B2
APPLICATION NO. : 15/249339
DATED : May 14, 2019
INVENTOR(S) : Sheng et al.

Page 1 of 1

It is certified that error appears in the above-identified patent and that said Letters Patent is hereby corrected as shown below:

In the Claims

Claim 14 (Column 16, Line 2), replace "TOT" with "IOT"

Claim 28 (Column 18, Line 2), replace "TOT" with "IOT"

Signed and Sealed this
Eighth Day of October, 2019

Andrei Iancu
*Director of the United States Patent and Trademark Office*